(12) United States Patent
Culpepper et al.

(10) Patent No.: US 6,396,252 B1
(45) Date of Patent: May 28, 2002

(54) SWITCHING DC-TO-DC CONVERTER WITH DISCONTINUOUS PULSE SKIPPING AND CONTINUOUS OPERATING MODES WITHOUT EXTERNAL SENSE RESISTOR

(75) Inventors: Barry James Culpepper, Sunnyvale, CA (US); Hidehiko Suzuki, Tokyo (JP)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/738,609

(22) Filed: Dec. 14, 2000

(51) Int. Cl.$^7$ .................................................. G05F 1/56
(52) U.S. Cl. ......................... 323/285; 323/225; 323/284
(58) Field of Search ................................ 323/222, 225, 323/282, 283, 284, 285

(56) References Cited

U.S. PATENT DOCUMENTS

| | | | | |
|---|---|---|---|---|
| 5,028,861 A | * | 7/1991 | Pace et al. ............... | 323/225 X |
| 5,912,552 A | * | 6/1999 | Tateishi ....................... | 323/285 |
| 6,242,896 B1 | * | 6/2001 | Mieberger ................... | 323/285 |

OTHER PUBLICATIONS

"LM2631 Synchronous Step–Down Power Supply Controller," National Semiconductor Data Sheet, twelve pages (Apr. 1999).
"LM2630 Synchronous Step–Down Power Supply Controller," National Semiconductor Data sheet, fourteen pages (Feb. 1999).

* cited by examiner

*Primary Examiner*—Jessica Han
(74) *Attorney, Agent, or Firm*—Girard & Equitz LLP

(57) ABSTRACT

A switching DC-to-DC converter having at least one power channel including an inductor and a controller which generates at least one power switch control signal for at least one power switch of each power channel. The converter is configured to operate in a continuous mode when the inductor current remains above zero, to enter a discontinuous pulse skipping mode of operation when the inductor current falls to zero (which occurs when the load current is below a threshold value), and to leave the discontinuous pulse skipping mode and resume continuous mode operation when the inductor current rises above zero. The main difference between the continuous and discontinuous pulse skipping modes is that in the continuous mode, a power switch has a duty cycle determined by a feedback signal indicative of the converter's output potential $V_{out}$ (so that the duty cycle is independent of the current drawn from the converter by the load), and in the discontinuous pulse skipping mode the power switch has a duty cycle which is the longer of a minimum duty cycle and a discontinuous (non-pulse-skipping) mode duty cycle. The discontinuous pulse skipping mode is more efficient than the continuous mode under conditions of low load current. Preferably, the controller includes cycle-skipping circuitry operable in the discontinuous pulse skipping mode and optionally also the continuous mode to cause the power switch to remain off for at least one cycle under the condition that the converter's output potential rises above a threshold. Preferably, the cycle-skipping circuitry includes a comparator which compares an error amplifier output (indicative of the converter output potential) with a threshold potential, and logic circuitry (e.g., an AND gate coupled to the comparator output) which asserts a latch-clearing signal once per switching cycle when the comparator output indicates that the converter's output has risen above the threshold. Other aspects of the invention are a switching controller for use in such a converter and a method for generating power switch control signals for such a converter in a discontinuous pulse skipping mode of operation.

45 Claims, 3 Drawing Sheets

US 6,396,252 B1

SWITCHING DC-TO-DC CONVERTER WITH DISCONTINUOUS PULSE SKIPPING AND CONTINUOUS OPERATING MODES WITHOUT EXTERNAL SENSE RESISTOR

BACKGROUND OF THE INVENTION

1. Field of the Invention

The present invention relates to switching DC-to-DC converters, and to switching controllers for use in such converters.

2. Description of the Related Art

One type of conventional switching power supply circuitry which employs voltage feedback to achieve output voltage regulation is the DC-to-DC converter of FIG. 1, which includes current mode switching controller chip 1, and buck converter circuitry external to the controller chip. The buck converter circuitry of FIG. 1 comprises NMOS transistor N1 (which functions as a power switch), inductor L, current sense resistor $R_{sns}$, capacitor C, and feedback resistor divider $R_{F1}$ and $R_{F2}$, connected as shown. The FIG. 1 circuit produces a regulated DC output voltage $V_{out}$ across load $R_{LOAD}$, in response to input DC voltage $V_{in}$.

Controller chip 1 implements a control signal channel which generates pulse width modulated power switch control signals ("PWM switch control" signals) for power switches N1 and N2 in response to a ramped voltage ($V_{osc}$) and a train of set pulses (generated by oscillator and ramped voltage generation circuit 2), a feedback signal (supplied from Node A to the inverting input of error amplifier 10) indicative of the DC-to-DC converter's output potential, and a feedback signal indicative of current through sense resistor $R_{SNS}$. One of the PWM switch control signals (asserted at the "Q" output of reset dominant latch 89) controls the gate of power switch N1. The other PWM switch control signal (asserted at the output of AND gate 102) controls the gate of power switch N2.

Typically, each PWM switch control signal is a binary signal having periodically occurring leading edges, and trailing edges which occur at times determined by the instantaneous value of the feedback signals. Specifically, the feedback provided from sense resistor $R_{SNS}$ to current sense amp 11 of controller 1 is a ramped voltage which is compared (in comparator 106) with a reference potential (100 mV in the specific implementation shown in FIG. 1). The output of comparator 106 is provided to one input of AND gate 100. The feedback signal indicative of the DC-to-DC converter output potential is asserted to the inverting input of error amplifier 10, and the noninverting input of error amplifier 10 is at a reference potential $V_{REF}$. The output of error amplifier 10 is compared (by comparator 8) with the ramped voltage $V_{OSC}$ summed with the current feedback signal from current sense amp 11, and the output of comparator 8 is provided to the other input of AND gate 100. The output of AND gate 100 is a train of reset pulses which drive one input of OR gate 113. The other input of gate 113 is driven by the output of skip comparator 114 (which compares the output of error amplifier 10 and threshold potential $V_{th}$). The output of OR gate 113 is employed to reset the latch 89. The described use of the voltage $V_{OSC}$ improves stability through a technique known as "ramp compensation." The value of the output of current sense amplifier 11 depends on the current through sense resistor $R_{SNS}$ (and thus the current through inductor L).

Controller chip 1 includes oscillator and ramped voltage generation circuit 2, comparators 8, 106, 107, and 114, reset dominant latch 89 (having a "set" terminal coupled to receive the "set" pulse train from circuit 2, a "reset" terminal coupled to the output of OR gate 113, an output coupled to the gate of switch N1 and to the "set" terminal of latch 91, and an inverted output coupled to one input of AND gate 102), latch 91 (having a "reset" terminal coupled to the output of comparator 107 and an output coupled to the other input of AND gate 102), error amplifier 10 (having an inverting input coupled to Node A and a non-inverting input maintained at reference potential $V_{ref}$), current sense amplifier 11 (having a non-inverting input coupled to the node between inductor L and resistor $R_{SNS}$, an inverting input coupled to the buck converter circuitry's output node, and an output coupled to an input of comparator 106 and to summing node B). The other input of comparator 106 is maintained at a reference potential (which is 100 mV above ground in an implementation of the FIG. 1 circuit, as indicated in FIG. 1).

Reference potential $V_{ref}$ (asserted to the noninverting input of error amplifier 10) is typically set by control bits and is normally not varied during use of the circuit. In order to set (or vary) the regulated level of the output voltage $V_{out}$, resistors $R_{F1}$ and $R_{F2}$ with the appropriate resistance ratio $R_{F1}/R_{F2}$ are coupled to Node A.

Oscillator 2 asserts a clock pulse train (having fixed frequency and waveform as indicated) to latch 89, and as long as the reset input to latch 89 is low, each positive-going leading edge of this pulse train sets latch 89. Each time latch 89 is set, the potential asserted by latch 89 (the Q output of latch 89) to the gate of transistor N1 causes transistor N1 to turn on. Although transistor N1 turns on at times in phase with the periodic clock pulse train, it turns off at times (determined by the feedback signals, reference potential $V_{ref}$ and the compensating ramp) that have arbitrary phase relative to the pulses of the periodic clock pulse train asserted to latch 89 by oscillator 2.

Each time latch 89 is set, the output of latch 89 sets latch 91, but since the inverted output of latch 89 goes low, the output of AND gate 102 goes low (thus preventing transistor N2 from turning on). After latch 89 has been set and before latch 89 is reset (while transistor N1 is on), transistor N2 remains off since the inverted output of latch 89 is low, forcing the output of AND gate 102 low. Then, in response to each reset of latch 89, the inverted output of latch 89 goes high, thus forcing the output of AND gate 102 high and turning on transistor N2. After N2 has been turned on (and N1 has been turned off), the output of comparator 107 goes high (to reset latch 91 and turn off transistor N2) when the current $I_{IND}$ through inductor L falls to zero. This sequence repeats during normal (continuous mode) operation of the FIG. 1 circuit (for as long as the output of comparator 106 remains high). During continuous mode operation of FIG. 1, the output of comparator 106 is high (a logical "one"), so that the reset times of latch 89 are determined by the output of comparator 8 (latch 89 is reset each time $V_{OSC}$ rises above the output of error amplifier 10).

When the current $I_{IND}$ through inductor L falls below a threshold value (e.g., under light load conditions), the output of current sense amplifier 11 drops below the 100 mV threshold which causes the output of comparator 106 to go low. If this occurs, latch 89 cannot be reset until the output of amplifier 11 rises back above 100 mV. Transistor N1 remains on, until the outputs of both comparator 106 and comparator 8 are high. Under light load conditions, this causes $V_{out}$ to rise and the output voltage of error amplifier 10 to fall. When the output voltage of error amplifier 10 (at node B) falls below $V_{th}$, comparator 114's output is held high, which drives the output of OR gate 113 high. This forces a constant high signal at the reset input of latch 89, and prevents latch 89 from setting. In this way, the converter is forced to operate in a pulse skipping mode (in which it skips pulses). In the pulse skipping mode, both transistors N1 and N2 remain off (for two or more cycles of $V_{osc}$) until latch 89 reset is released (i.e., until the output of OR gate goes low).

Upon entry into the pulse skipping mode (sometimes referred to as the "skip mode"), the reset input of latch 89 is held high by OR gate 113 (which forces the latch 89 to be reset), N1 is forced off by latch 89, and N2 turns off and remains off once the inductor current $I_{IND}$ falls to zero. The pulse skipping mode ends, and the FIG. 1 circuit returns to continuous mode operation, only when the output of error amplifier 10 rises above a threshold value so as to cause the output of comparator 114 to go low. When the output of comparator 114 is low, the output of comparator 8 again controls the resetting of latch 89 as described.

Oscillator 2 asserts ramped voltage $V_{osc}$ (which periodically increases at a fixed ramp rate and then decreases, with a waveform as indicated) at a second output thereof.

In some variations on the FIG. 1 circuit, logic circuitry is provided to prevent transistor N2 from turning off when the inductor current reaches zero amps, and to prevent comparator 114 from preventing latch 89 from setting (thus forcing the circuit to operate always in the continuous mode) when an appropriate control signal is asserted to the logic circuitry.

Skip mode operation of the FIG. 1 converter achieves more efficient operation under low load conditions than would continuous mode operation. However, the conventional design of FIG. 1 is subject to several limitations and disadvantages, including in that the FIG. 1 requires a sense resistor ($R_{SNS}$) external to the controller chip (chip 1).

Multi-channel variations on the circuit of FIG. 1 can readily be implemented by those of ordinary skill in the art. Other conventional DC-to-DC converters include a switching controller chip, and power channel circuitry (e.g., boost converter circuitry) other than buck converter circuitry external to the controller chip. Some conventional multi-channel DC-to-DC converters employ switching controllers which receive only feedback indicative of the potential at the converter's output node and do not receive feedback indicative of the current through the inductor of each individual power channel (e.g. the feedback supplied to current sense amplifier 11 of FIG. 1). Another conventional DC-to-DC converter includes a switching regulator chip (which performs the functions of a switching controller and also includes internal power switches), and additional circuitry external to the regulator chip (in contrast with a converter that includes a controller chip having internal control signal channel circuitry, and external power channel circuitry outside the controller chip). It is contemplated that all such conventional converters can be improved in accordance with the invention.

SUMMARY OF THE INVENTION

In preferred embodiments, the invention is a switching DC-to-DC converter having a controller which generates power switch control signals for at least one power channel, and external circuitry (having at least one power channel including a first power switch, an inductor coupled between the first power switch and the converter's output node, and typically also a second power switch coupled with the first power switch and the inductor). The external circuitry is external to the controller, the controller is typically implemented as an integrated circuit, and each power switch is typically an MOS transistor. The converter is configured to operate in a continuous mode when the current through the inductor remains above zero. In typical implementations, during the continuous mode, the inductor current remains positive as it rises and falls in response to the first and second power switches turning on and off 180 degrees out of phase with respect to each other, with the first power switch switching on and off once per switching cycle except in preferred implementations which include cycle-skipping circuitry operable in the continuous mode to cause the first power switch and the second power switch to remain off during a cycle under the condition that the converter's output potential rises above a threshold potential.

The converter is also configured to enter a discontinuous mode of operation when the inductor current falls to zero (which occurs when the load current is below a threshold value), and to leave the discontinuous mode and resume continuous mode operation when the inductor current rises above zero. The main difference between the continuous and discontinuous modes of operation is as follows. In the continuous mode, the first power switch has a duty cycle which is independent of the current drawn from the converter by the load. Also, the second power switch is turned on when the first power switch turns off, and remains on until the first power switch is turned on again. In the discontinuous mode, the first power switch has a duty cycle which is dependent on load. Also in the discontinuous mode, the second power switch is turned on when the first power switch turns off, and is turned on when the inductor current reaches zero amps. The discontinuous mode is more efficient than the continuous mode under conditions of low load current.

In preferred implementations, the discontinuous mode is a pulse skipping mode (referred to herein as a discontinuous skip mode) in which the first power switch has a duty cycle which is the longer of a minimum duty cycle and a discontinuous mode duty cycle (the load-dependent duty cycle under which the converter would operate, when asserting the same output potential in response to the same input potential, if the circuitry for imposing the minimum duty cycle were disabled or omitted). The minimum duty cycle is defined as a proportion of the continuous mode duty cycle under which the converter would assert the same output potential (as it does in the discontinuous skip mode) in response to the same converter input potential. In a typical implementation (to be described with reference to FIG. 2), the minimum duty cycle is 85% of the continuous mode duty cycle. In the discontinuous skip mode, when the first power switch operates with the minimum duty cycle, the converter's output voltage rises, and the error amplifier's output potential decreases.

Preferably, the controller includes cycle-skipping circuitry operable in the discontinuous skip mode to cause the first power switch to remain off for at least one cycle under the condition that the converter's output potential rises above a threshold. In preferred embodiments, the cycle-skipping circuitry includes a comparator which compares an error amplifier output (indicative of the converter's output potential) with a threshold potential, and logic circuitry (e.g., an AND gate coupled to the output of the comparator) which asserts a latch-clearing signal once per switching cycle when the comparator output indicates that the converter's output has risen above the threshold. A latch (which controls the times at which the first power switch turns off and on) receives each latch-clearing signal and causes the first power switch to skip the next cycle in response to each latch-clearing signal. In some embodiments, the cycle-skipping circuitry is operable in both the continuous mode and the discontinuous skip mode.

Other aspects of the invention are a switching controller for use in such a converter (the controller having both a discontinuous mode and a continuous mode of operation), and a method for generating power switch control signals for a DC-to-DC converter in a discontinuous mode of operation (without use of an external sense resistor) under conditions of low load current, with the converter otherwise operating in a continuous mode. Typically, a switching controller that embodies the invention is implemented as an integrated circuit, and each power switch is external to the controller chip and coupled to receive a power switch control signal from the controller chip.

DETAILED DESCRIPTION OF THE PREFERRED EMBODIMENTS

A preferred embodiment of the invention will be described with reference to FIG. 2. The DC-to-DC converter of FIG. 2 has a switching controller chip 21, and buck converter circuitry (defining a power delivery channel including power switches N1 and N2, which are NMOS transistors as in FIG. 1) external to controller chip 21.

Figure 1:
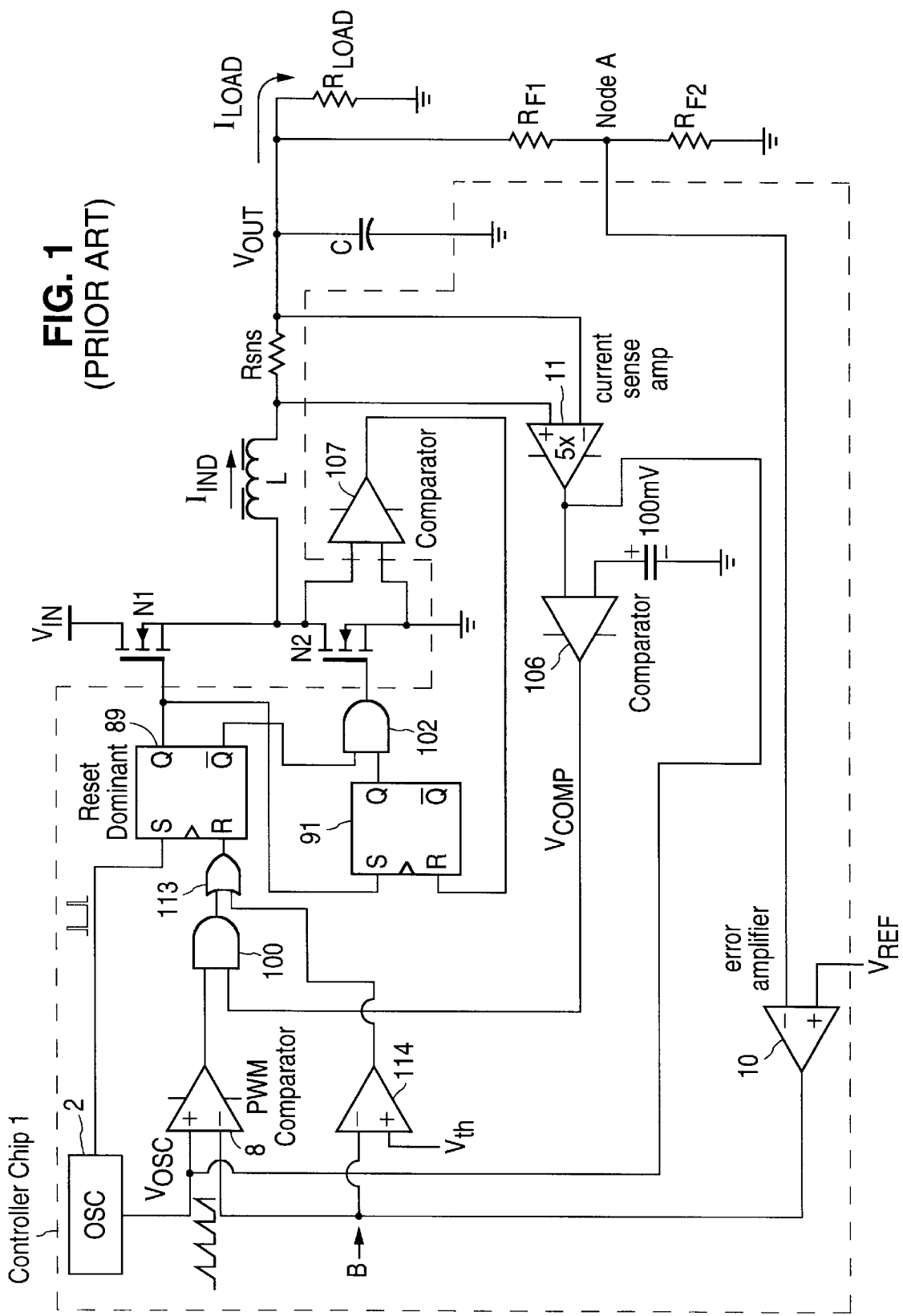
FIG. 1 is a simplified schematic diagram of a conventional current-mode switching DC-to-DC converter including a controller chip 1 which generates PWM power switch control signals for two power switches (transistors N1 and N2) and which uses a feedback signal from a sense resistor ($R_{SNS}$) external to the controller to determine whether the controller operates in a continuous mode or a skip mode.
Figure 2:
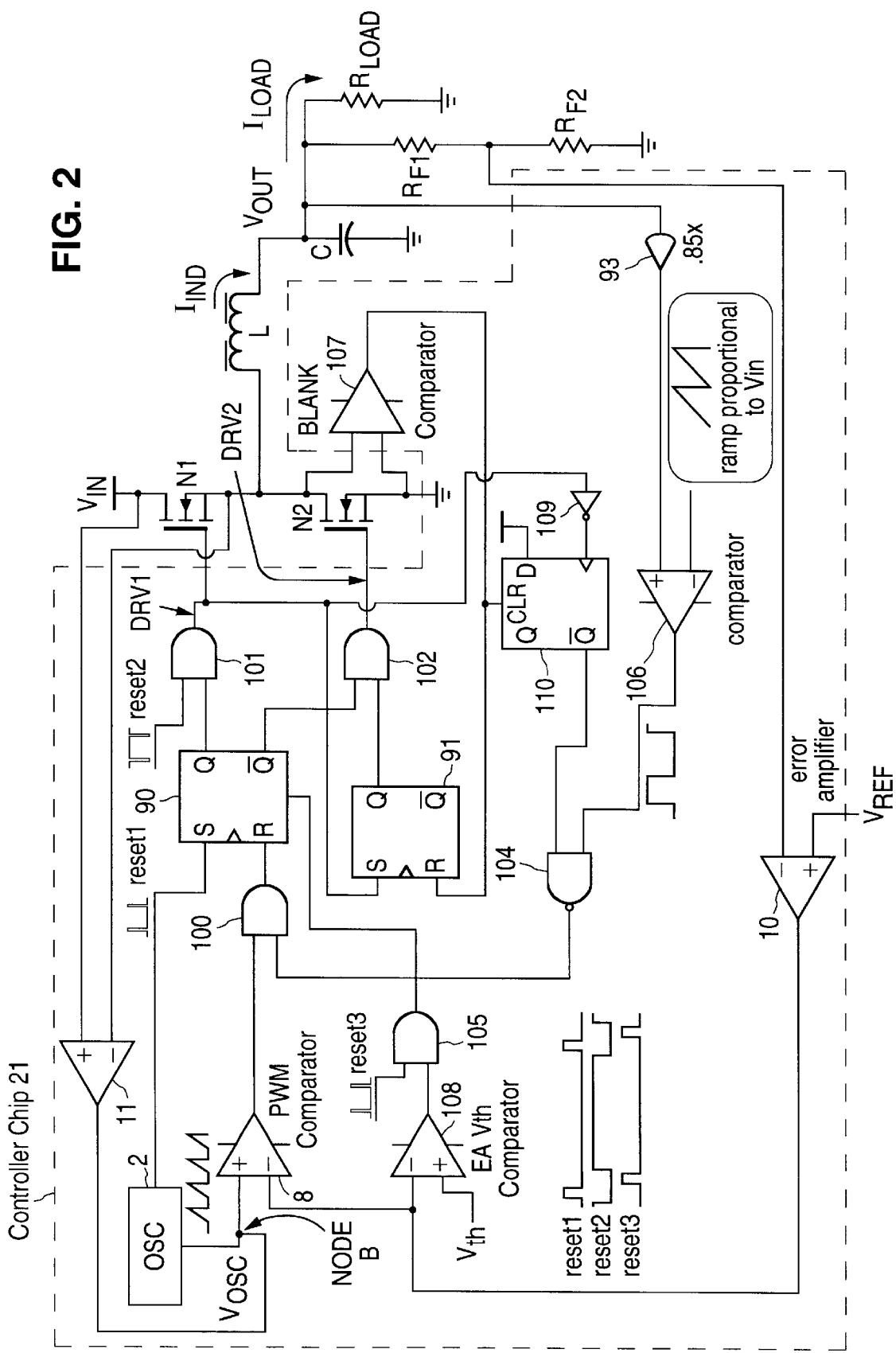
FIG. 2 is a simplified schematic diagram of a preferred embodiment of a current-mode DC-to-DC converter designed in accordance with the invention, which includes a controller chip 21 which generates PWM power switch control signals for two power switches (transistors N1 and N2)) and which generates a feedback signal (without using a sense resistor external to the controller) which determines whether the controller operates in a discontinuous skip mode (in which cycles are skipped in the sense that power switch N1 remains off for multiple switching cycles without being reset), a discontinuous mode (without pulse skipping), or a continuous mode.

The external buck converter circuitry is identical to that of FIG. 1 except in that sense resistor $R_{SNS}$ is omitted from FIG. 2, and elements of controller 21 which are identically numbered to corresponding elements of controller 1 of FIG. 1 are identical in FIGS. 1 and 2. Thus, the above description of relevant aspects of the FIG. 1 circuit will not be repeated below with reference to FIG. 2, and only those respects in which the structure and operation of FIG. 2 differ from the structure and operation of FIG. 1 will be discussed below.

With reference to FIG. 2, controller 21 includes error amplifier 10, having a non-inverting input maintained at reference potential $V_{ref}$, a summing node (Node B), current sense amplifier 11 (having a non-inverting input tied to the source of transistor N1, an inverting input tied to the drain of N1, and an output coupled to Node B), oscillator and ramp generation circuit 2, comparators 8, 106, 107, and 108, inverter 109, D-clock triggered latch 110, AND gates 100, 101, 102, and 105, NAND gate 104, latches 90 and 91, and attenuator 93 (having gain equal to 0.85 in a preferred implementation), connected as shown.

The output of attenuator 93 (a potential $kV_{out}$, where k=0.85 in a preferred implementation) is asserted to the noninverting input of comparator 106. The inverting input of comparator is coupled to receive a ramped voltage whose period is the same as that of $V_{OSC}$ (which is generated as in FIG. 1 by circuit 2 within the controller) and whose peak level is proportional to the converter's input potential $V_{in}$.

The output of comparator 106 is provided to one input of NAND gate 104. The inverted output of latch 110 is provided to the other input of NAND gate 104. The output of NAND gate 104 is provided to one input of AND gate 100. The output of comparator 8 is provided to the other input of AND gate 100.

Figure 3:
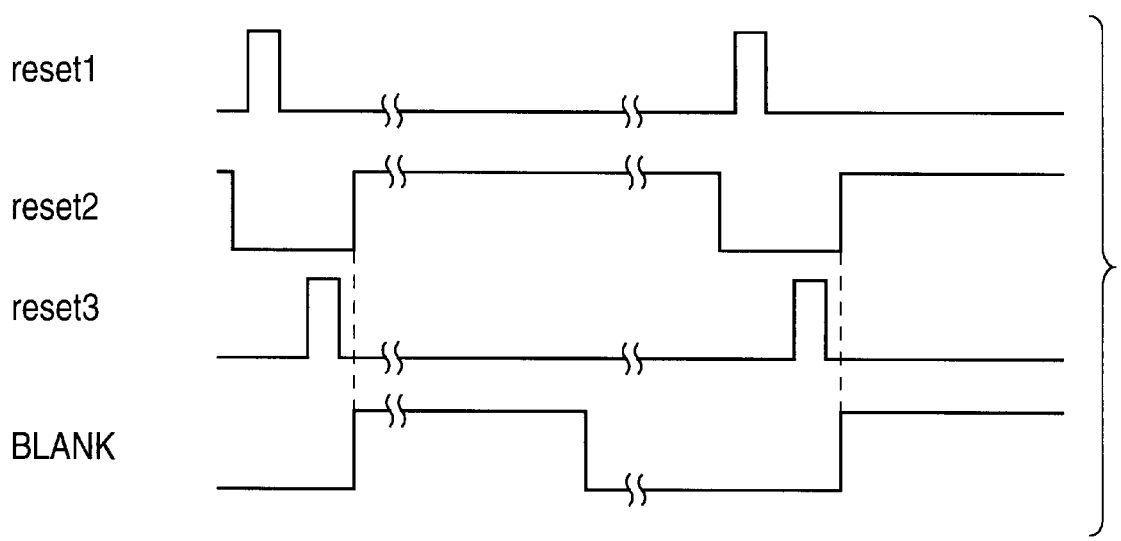
FIG. 3 is a timing diagram of signals generated during operation of the FIG. 2 circuit.

Controller 21 has a continuous mode of operation in which the output of error amplifier 10 is compared (by comparator 8) with the sum of the ramped voltage $V_{OSC}$ and the output of current sense amplifier 11, the output of NAND gate 104 is always high (a logical "one") so that one input of AND gate 100 is always high, and the output of AND gate 100 is thus a train of binary reset pulses (whose rising edges are determined by the rising edges of the output of comparator 8) which are employed to reset the latch 90. Oscillator 2 asserts a clock pulse train (identified as "reset1" and having fixed frequency and waveform as indicated in FIG. 3) to the "set" input of latch 90, and each positive-going leading edge of pulse train reset1 thus sets latch 90. Each time latch 90 is set, the potential asserted by latch 90 (the Q output of latch 90) causes AND gate 101 to turn on transistor N1. In the continuous mode of operation, although transistor N1 turns on at times in phase with periodic pulse train reset1, it turns off at times (determined by the feedback signal asserted from Node A to amplifier 10, by reference potential $V_{ref}$, by the output of amplifier 11 and by the ramp signal asserted by oscillator 2) that have arbitrary phase relative to the pulses of the periodic clock pulse train from oscillator 2.

One input of AND gate 101 is coupled to the noninverted output (Q output) of latch 90 and output of AND gate 101 (at which PWM signal DRV1 is asserted) is coupled to the gate of transistor N1. The other input of AND gate 101 is coupled to receive a pulse train identified as "reset2." As shown in the timing diagram of FIG. 3, since the rising edges of the pulses of train reset2 lag the rising edges of the pulses of train reset1 by a fixed phase, AND gate 101 causes transistor 101 to turn on a short, fixed delay time after each time that latch 90 is set by a rising edge of pulse train reset1.

The output of AND gate 101 is provided to the set terminal of latch 91, and the noninverted (Q) output of latch 91 is asserted to one input of AND gate 102. The inverted output of latch 90 is coupled to the other input of AND gate 102. Comparator 107 is disabled in the continuous mode, so the output of comparator 107 remains low and latch 91 is never reset. Thus, in the continuous mode of operation, AND gate 102 forces transistor N2 off whenever transistor N1 is on and forces transistor N2 on whenever transistor N1 is off.

As in FIG. 1, reference potential $V_{ref}$ (asserted to the noninverting input of error amplifier 10) is typically set by control bits and is normally not varied during use of the circuit. In order to set (or vary) the regulated level of the output voltage $V_{out}$, resistors $R_{F1}$ and $R_{F2}$ with the appropriate resistance ratio $R_{F1}/R_{F2}$ are coupled to Node A.

The output of AND gate 101 is inverted by inverter 109 and asserted to the clock input of latch 110. The data input (input D) of latch 110 is held at a high level. In the continuous mode of operation, latch 110 is never cleared since the output of comparator 107 remains low. Thus, the inverted output of latch 110 (which is asserted to one input of NAND gate 104) remains low in the continuous mode. Thus, in the continuous mode, the output of NAND gate 104 remains high and the output of AND gate 100 (which controls the resetting of latch 90) is determined by the output of comparator 8.

Comparator 108 and AND gate 105 are provided to implement cycle skipping, in both the above-described continuous operating mode and the discontinuous operating mode to be described below. The inverting input of comparator 108 is coupled to receive the output of error amplifier 10, and the noninverting input of comparator 108 is held at reference potential $V_{th}$. The output of comparator 108 is provided to one input of AND gate 105. The other input of AND gate 105 is coupled to receive periodic pulse train "reset3" (having period identical to that of pulse train reset1, but whose pulses are slightly phase-delayed relative to those of reset1, as shown in the timing diagram of FIG. 3). Thus, when the converter's output potential $V_{out}$ rises too high, namely above a threshold potential (to cause the absolute value of the output of error amplifier 10 to fall below reference potential Vth at comparator 108's noninverting input), the output of comparator 108 goes high. If the output of comparator 108 is high at a time when reset3 is high, AND gate 105 asserts a high potential to the "clear" input of latch 90, thereby clearing latch 90. Note that this clearing is forced to occur after the setting of latch 90, but before the "reset2" signal allows transistor N1 to turn on, and thus it causes transistor N1 to remain off for the next cycle of pulse train reset1. Each such skipped cycle of transistor N1 tends to reduce the converter's output potential $V_{out}$ toward a desired level (namely, a level below the above-noted threshold potential).

In variations on the FIG. 2 embodiment, the controller does not implement cycle skipping (e.g., elements 105 and 108 are omitted).

The main difference between the continuous and discontinuous modes of operation is as follows. In the continuous mode, transistor N1 is turned on periodically and turned off at times determined by the output of comparator 8 (the latter times being independent of the current drawn from the converter by the load), and transistor N2 turns on whenever transistor N1 is turned off and transistor N2 remains on until transistor N1 is turned on again. In the discontinuous mode, transistor N1 is turned on periodically and turned off at times determined by the output of comparator 8. Also in the discontinuous mode, transistor N2 turns on when transistor N1 turns off, and transistor N2 turns off when the inductor current drops to zero amps.

The preferred embodiment shown in FIG. 2 implements a discontinuous pulse skipping mode (sometimes referred to herein as a discontinuous skip mode). While in the discontinuous skip mode, transistor N1 is turned on periodically and turned off (during each cycle) at a time determined by the later of the falling edge of comparator 106's output and the rising edge of comparator 8's output. The FIG. 2 circuit is implemented so that, in the discontinuous skip mode, transistor N1 is turned off at later times than it would have been (i.e., so that transistor N1 has a duty cycle no shorter than 85% of the duty cycle that it would have had) in the continuous mode. Thus, in the discontinuous skip mode, there is a minimum duty cycle for transistor N1 which causes the converter's output voltage to increase and causes the output of error amplifier 10 to drop. In the discontinuous skip mode, when the output of error amplifier 10 drops below the threshold potential (mentioned above with reference to elements 108 and 105), the output of AND gate 105 forces skipping of the subsequent switching cycle (i.e., it forces transistor N1 off for such cycle). The discontinuous skip mode is more efficient than either the discontinuous mode (without pulse skipping) or the continuous mode under conditions of low load current.

More specifically, when controller 21 is in the continuous mode of operation, it enters the discontinuous mode in response to the inductor current $I_{IND}$ falling to zero, which causes the output of comparator 107 to go high to reset latch 91 and to clear latch 110. When latch 110 is cleared, its output goes high so that the output of NAND gate 104 is low whenever the output of comparator 106 is high and high whenever the output of comparator 106 is low. Thus, each rising edge of the output of AND gate 100 occurs (during each switching cycle) at a time determined by the later of a falling edge of comparator 106's output and a rising each of comparator 8's output. Since transistor N1 is turned on periodically (once during each switching cycle) and turned off (during each cycle) at a time determined by the output of AND gate 100, the duty cycle of transistor N1 is determined (during each cycle of the discontinuous mode) by the time of occurrence of the later of the falling edge of comparator 106's output and the rising edge comparator 8's output (except in the case that AND gate 105 resets latch 90, as described elsewhere herein).

In a preferred implementation of FIG. 2, comparator 106 and attenuator 93 (and the circuitry for generating the ramped voltage provided to the inverting input of comparator 106) are implemented as is the on-time signal generation circuit of U.S. patent application Ser. No. 09/687,010, filed on Oct. 13, 2000, by Hidehiko Suzuki and assigned to the assignee of the present invention. In a preferred implementation in which attenuator 93 has gain equal to 0.85, the negative-going pulse asserted at comparator 106's output during each cycle is in phase with each positive-going pulse asserted at comparator 8's output during each cycle, but each positive-going pulse asserted at comparator 106's output has width equal to 85% of the width of each positive-going pulse asserted at comparator 8's output. Such 85% pulse width ratio assures efficient operation of the FIG. 2 converter under conditions of both high and low load current, with typical desired values of input potential $V_{IN}$ and output potential $V_{out}$. Other embodiments of the invention are implemented with a pulse width ratio other than 85%.

The invention can be implemented in a voltage mode switching controller as well as in a current mode switching controller (e.g., that of FIG. 2). In all embodiments of the invention, discontinuous mode operation is achieved without use of an external sense resistor, and results in less output ripple and higher efficiency than continuous mode operation under light load conditions.

Other aspects of the invention are a switching controller for use in a switching DC-to-DC converter (the controller having a continuous mode and a discontinuous pulse skipping mode as described, and preferably also a discontinuous mode of operation without pulse skipping as described), and a method for generating power switch control signals for a DC-to-DC converter in a discontinuous pulse skipping mode (discontinuous skip mode) of operation (without use of an external sense resistor) under conditions of low load current, with the converter otherwise operating in a continuous mode. In preferred embodiments, the method is a method for generating a power switch control signal for a DC-to-DC converter which generates an output potential $V_{out}$ at an output node in response to an input potential by switching at least a first power switch having an input coupled to receive the input potential and an output coupled to a first node, wherein the converter has an inductor coupled between the first node and the output node so that an inductor current flows through the inductor during operation of the converter, said method including the steps of:

(a) in a continuous mode in which the inductor current remains above zero, generating the power switch control signal in response to a feedback signal indicative of the output potential $V_{out}$, such that said power switch control signal causes the first power switch to operate with a continuous mode duty cycle determined by the feedback signal; and (b) entering a discontinuous pulse skipping mode when the inductor current falls to zero, and in the discontinuous pulse skipping mode, generating the power switch control signal in response to a second feedback signal indicative of $kV_{out}$, where k is a constant, and in response to the feedback signal, such that said power switch control signal causes the first power switch to operate with a duty cycle equal to the longer of a minimum duty cycle and a discontinuous mode duty cycle, wherein the discontinuous mode duty cycle is a duty cycle at which the converter would operate in response to said feedback signal when said converter generates the output potential in response to the input potential during a discontinuous mode without pulse skipping.

In some embodiments, the converter also includes a second power switch having an input coupled to the first node and an output coupled to a second node, and step (b) includes the step of determining when the inductor current falls to zero by monitoring voltage across the second power switch.

In some embodiments, step (b) includes the step of causing the first power switch to remain off for at least one switching period in response determining that the output potential is above a predetermined threshold. In some embodiment, each of step (a) and (b) includes the step of causing the first power switch to remain off for at least one switching period in response determining that the output potential is above a predetermined threshold.

Typically, a switching controller that embodies the invention is implemented as an integrated circuit, and each power switch is external to the controller chip and coupled to receive a power switch control signal from the controller chip.

It should be understood that while certain forms of the present invention have been illustrated and described herein, the invention is not to be limited to the specific forms or arrangements of parts described and shown or the specific methods described.

What is claimed is:

1. A switching DC-to-DC converter which generates an output potential $V_{out}$ at an output node in response to an input potential, said converter comprising:

a switching controller configured to generate at least one switch control signal including a first switch control signal in response to a first feedback signal indicative of the output potential $V_{out}$ and a second feedback signal indicative of $kV_{out}$, where k is a constant, the switching controller having a switching period; and external circuitry including a first power switch and an inductor, wherein the first power switch has an input coupled to receive the input potential and an output coupled to a first node and is coupled to receive the first switch control signal, the inductor is coupled between the first node and the output node, and an inductor current flows through the inductor during operation of the converter, wherein the switching controller is configured to operate in a continuous mode in which the inductor current remains above zero and the first switch control signal causes the first power switch to operate with a continuous mode duty cycle determined by the first feedback signal, and the switching controller is configured to enter a discontinuous pulse skipping mode in response to the inductor current falling to zero, wherein in the discontinuous pulse skipping mode, the first switch control signal causes the first power switch to operate with a duty cycle which is the longer of a minimum duty cycle and a discontinuous mode duty cycle, wherein the discontinuous mode duty cycle is a duty cycle at which the converter would operate in response to said first feedback signal when said converter generates the output potential in response to the input potential during a discontinuous mode without pulse skipping.

2. The converter of claim 1, wherein the controller includes mode control circuitry coupled to the output node and configured to trigger entry into the discontinuous pulse skipping mode upon detecting that the inductor current is zero and to trigger entry into the continuous mode when the inductor current rises from zero to a level above zero.

3. The converter of claim 2, wherein the external circuitry also includes a second power switch having an input coupled to a first node and an output coupled to a second node, and the mode control circuitry includes:

a first comparator having one input coupled to the first node, another input coupled to the second node, and an output at which the first comparator asserts a comparator output; and a mode signal generation circuit having an input coupled to receive the comparator output, and being configured to produce in response to said comparator output a mode signal indicative of whether or not the inductor current is above zero.

4. The converter of claim 3, wherein the controller is a current mode switching controller, and wherein the controller also includes:

first switch control signal generation circuitry coupled to receive the first feedback signal;

an attenuator having an input coupled to the output node and an attenuator output at which the attenuator asserts the second feedback signal;

a second comparator having an input coupled to receive the second feedback signal, another input coupled to receive a periodic ramped voltage having period equal to the switching period and peak level proportional to the input potential, and an output; and logic circuitry having an input coupled to receive the mode signal, another input coupled to the output of the second comparator, and an output coupled to the first switch control signal generation circuitry.

5. The converter of claim 4, wherein the logic circuitry comprises:

a NAND gate having an input coupled to receive the mode signal, another input coupled to the output of the second comparator, and an output; and an AND gate having an input coupled to the output of the NAND gate, and another input and an output coupled to the first switch control signal generation circuitry.

6. The converter of claim 1, wherein the controller includes cycle-skipping circuitry operable in at least the discontinuous pulse skipping mode to cause the first power switch to remain off for at least one said switching period in response to the first feedback signal indicating that the output potential is above a predetermined threshold.

7. The converter of claim 6, wherein the controller includes an error amplifier having an input coupled to receive the first feedback signal and an output, and the cycle-skipping circuitry includes:

a comparator having an input coupled to the output of the error amplifier, another input maintained at a threshold potential, and an output at which the comparator asserts a comparator output signal; and logic circuitry, having an input coupled to receive the comparator output signal, and configured to generate a control signal for causing the first power switch to remain off for at least one said switching period when the comparator output signal indicates that the output potential is above the predetermined threshold.

8. The converter of claim 7, wherein the logic circuitry is an AND gate having a first input coupled to receive the comparator output signal and a second input coupled to receive a periodic pulse train whose pulses occur with said switching period.

9. The converter of claim 7, wherein the logic circuitry is configured to assert a latch-clearing signal once during each said switching period when the comparator output signal indicates that the output potential exceeds the predetermined threshold.

10. The converter of claim 6, wherein the cycle-skipping circuitry is operable in both the discontinuous pulse skipping mode and the continuous mode to cause the first power switch to remain off for at least one said switching period in response to the first feedback signal indicating that the output potential is above a predetermined threshold.

11. The converter of claim 1, wherein the switching controller is a current mode switching controller, the at least one switch control signal includes a second switch control signal, and the external circuitry is buck converter circuitry, said buck converter circuitry including:

a second power switch having an input coupled to the first node, an output coupled to a second node, and a control terminal coupled to receive the second switch control signal.

12. The converter of claim 11, wherein the controller includes mode control circuitry coupled to the output node and configured to trigger entry into the discontinuous pulse skipping mode upon detecting that the inductor current is zero and to trigger entry into the continuous mode when the inductor current rises from zero to a level above zero, wherein the mode control circuitry includes:

a first comparator having one input coupled to the first node, another input coupled to the second node, and an output at which the first comparator asserts a comparator output; and a mode signal generation circuit having an input coupled to receive the comparator output, and being configured to produce in response to said comparator output a mode signal indicative of whether or not the inductor current is above zero.

13. The converter of claim 11, wherein each of the first power switch and the second power switch is an NMOS transistor.

14. The converter of claim 13, wherein the controller is implemented as an integrated circuit, and the external circuitry is external to said integrated circuit.

15. The converter of claim 11, wherein the controller is configured so that the continuous mode duty cycle is proportional to a ratio of the input potential and the output potential.

16. The converter of claim 1, wherein the controller is implemented as an integrated circuit, and the external circuitry is external to said integrated circuit.

17. A switching DC-to-DC converter which generates an output potential $V_{out}$ at an output node in response to an input potential, said converter comprising:

a switching controller configured to generate at least a first switch control signal and a second switch control signal in response to a first feedback signal indicative of the output potential $V_{out}$ and a second feedback signal indicative of $kV_{out}$, where k is a constant, the switching controller having a switching period; and external circuitry including a first power switch, a second power switch, and an inductor, wherein the first power switch has an input coupled to receive the input potential, an output coupled to a first node, and a control terminal coupled to receive the first switch control signal, the second power switch has an input coupled to the first node, an output coupled to a second node, and a control terminal coupled to receive the second switch control signal, the inductor is coupled between the first node and the output node, and an inductor current flows through the inductor during operation of the converter, wherein the switching controller is configured to operate in a continuous mode in which the inductor current remains above zero and the first switch control signal causes the first power switch to operate with a continuous mode duty cycle determined by the first feedback signal, and the switching controller is configured to enter a discontinuous pulse skipping mode in response to the inductor current falling to zero, wherein in the discontinuous pulse skipping mode, the first switch control signal causes the first power switch to operate with a duty cycle which is the longer of a minimum duty cycle and a discontinuous mode duty cycle, wherein the discontinuous mode duty cycle is a duty cycle at which the converter would operate in response to said first feedback signal when said converter generates the output potential in response to the input potential during a discontinuous mode without pulse skipping.

18. The converter of claim 17, wherein the controller includes cycle-skipping circuitry operable in at least the discontinuous pulse skipping mode to cause the first power switch to remain off for at least one said switching period in response to the first feedback signal indicating that the output potential is above a predetermined threshold, and wherein during the continuous mode when the first feedback signal indicates that the output potential is not greater than the predetermined threshold, the first power switch is on when the second power switch is off, and the first power switch is off when the second power switch is on, and the first power switch switches on and off once per each said switching period.

19. The converter of claim 18, wherein the controller includes an error amplifier having an input coupled to receive the first feedback signal and an output, and the cycle-skipping circuitry includes:

a comparator having an input coupled to the output of the error amplifier, another input maintained at a threshold potential, and an output at which the comparator asserts a comparator output signal; and logic circuitry, having an input coupled to receive the comparator output signal, and configured to generate a control signal for causing the first power switch to remain off for at least one said switching period when the comparator output signal indicates that the output potential is above the predetermined threshold.

20. The converter of claim 19, wherein the logic circuitry is an AND gate having a first input coupled to receive the comparator output signal and a second input coupled to receive a periodic pulse train whose pulses occur with said switching period.

21. The converter of claim 19, wherein the logic circuitry is configured to assert a latch-clearing signal once during each said switching period when the comparator output signal indicates that the output potential exceeds the predetermined threshold.

22. The converter of claim 18, wherein the cycle-skipping circuitry is operable in both the discontinuous pulse skipping mode and the continuous mode to cause the first power switch to remain off for at least one said switching period in response to the first feedback signal indicating that the output potential is above a predetermined threshold.

23. The converter of claim 17, wherein each of the first power switch and the second power switch is an NMOS transistor.

24. The converter of claim 17, wherein the controller is configured so that the continuous mode duty cycle is proportional to a ratio of the input potential and the output potential.

25. The converter of claim 17, wherein the controller includes mode control circuitry coupled to the output node and configured to trigger entry into the discontinuous pulse skipping mode upon detecting that the inductor current is zero and to trigger entry into the continuous mode when the inductor current rises from zero to a level above zero.

26. The converter of claim 25, wherein the mode control circuitry includes:
    a first comparator having one input coupled to the first node, another input coupled to the second node, and an output at which the first comparator asserts a comparator output; and
    a mode signal generation circuit having an input coupled to receive the comparator output, and being configured to produce in response to said comparator output a mode signal indicative of whether or not the inductor current is above zero.

27. The converter of claim 26, wherein the controller is a current mode switching controller, and wherein the controller also includes:
    first switch control signal generation circuitry coupled to receive the first feedback signal;
    an attentuator having an input coupled to the output node and an attentuator output at which the attenuator asserts the second feedback signal;
    a second comparator having an input coupled to receive the second feedback signal, another input coupled to receive a periodic ramped voltage having period equal to the switching period and peak level proportional to the input potential, and an output; and
    logic circuitry having an input coupled to receive the mode signal, another input coupled to the output of the second comparator, and an output coupled to the first switch control signal generation circuitry.

28. The converter of claim 27, wherein the logic circuitry comprises:
    a NAND gate having an input coupled to receive the mode signal, another input coupled to the output of the second comparator, and an output; and
    an AND gate having an input coupled to the output of the NAND gate, and another input and an output coupled to the first switch control signal generation circuitry.

29. The converter of claim 17, wherein the switching controller is a current mode switching controller, the external circuitry is buck converter circuitry, and the controller includes mode control circuitry coupled to the output node and configured to trigger entry into the discontinuous pulse skipping mode upon detecting that the inductor current is zero and to trigger entry into the continuous mode when the inductor current rises from zero to a level above zero, wherein the mode control circuitry includes:
    a first comparator having one input coupled to the first node, another input coupled to the second node, and an output at which the first comparator asserts a comparator output; and
    a mode signal generation circuit having an input coupled to receive the comparator output, and being configured to produce in response to said comparator output a mode signal indicative of whether or not the inductor current is above zero.

30. A switching controller having a switching period for use with power channel circuitry of a switching DC-to-DC converter, wherein the power channel circuitry generates an output potential $V_{out}$ at an output node in response to an input potential, the power channel circuitry includes a first power switch and an inductor, the first power switch has an input coupled to receive the input potential and an output coupled to a first node, and the inductor is coupled between the first node and the output node so that an inductor current flows through the inductor during operation of the converter, said controller comprising:
    switch control signal generation circuitry configured to generate at least one switch control signal including a first switch control signal in response to set and reset signals; and
    additional circuitry coupled to the switch control signal generation circuitry and to receive a first feedback signal indicative of the output potential $V_{out}$ and a second feedback signal indicative of $kV_{out}$, where k is a constant, wherein the additional circuitry is configured to generate the set signals and the reset signals in response to the first feedback signal and the second feedback signal, wherein the controller is configured to operate in a continuous mode in which the inductor current remains above zero and the first switch control signal causes the first power switch to operate with a continuous mode duty cycle determined by the first feedback signal, and the controller is configured to enter a discontinuous pulse skipping mode in response to the inductor current falling to zero, wherein in the discontinuous pulse skipping mode, the first switch control signal causes the first power switch to operate with a duty cycle which is the longer of a minimum duty cycle and a discontinuous mode duty cycle, wherein the discontinuous mode duty cycle is a duty cycle at which the converter would operate in response to said first feedback signal when said converter generates the output potential in response to the input potential during a discontinuous mode without pulse skipping.

31. The controller of claim 30, wherein the additional circuitry includes:
    mode control circuitry configured to trigger entry of the controller into the discontinuous pulse skipping mode upon detecting, when coupled to the output node, that the inductor current is zero, and configured to trigger entry into the continuous mode upon detecting, when coupled to the output node, that the inductor current rises from zero to a level above zero.

32. The controller of claim 31, wherein the power channel circuitry also includes a second power switch having an input coupled to the first node and an output coupled to a second node, and wherein the mode control circuitry includes:

a first comparator having one input configured to be coupled to the first node, another input configured to be coupled to the second node, and an output at which the first comparator asserts a comparator output; and a mode signal generation circuit having an input coupled to receive the comparator output, and being configured to produce in response to said comparator output a mode signal indicative of whether or not the inductor current is above zero.

33. The controller of claim 32, wherein the controller is a current mode switching controller, and wherein the additional circuitry also includes:

an attentuator having an input configured to be coupled to the output node and an attentuator output at which the attenuator asserts the second feedback signal;

a second comparator having an input coupled to receive the second feedback signal, another input coupled to receive a periodic ramped voltage having period equal to the switching period and peak level proportional to the input potential, and an output; and logic circuitry having an input coupled to receive the mode signal, another input coupled to the output of the second comparator, and an output coupled to the first switch control signal generation circuitry.

34. The controller of claim 33, wherein the logic circuitry comprises:

a NAND gate having an input coupled to receive the mode signal, another input coupled to the output of the second comparator, and an output; and an AND gate having an input coupled to the output of the NAND gate, and another input and an output coupled to the first switch control signal generation circuitry.

35. The controller of claim 30, wherein the additional circuitry also includes:

cycle-skipping circuitry operable in at least the discontinuous pulse skipping mode to assert to the switch control signal generation circuitry a control signal when the output potential is above the predetermined threshold, and wherein the switch control signal generation circuitry is configured to cause the first power switch to remain off for at least one said switching period in response to said control signal.

36. The controller of claim 35, wherein the additional circuitry also includes an error amplifier having an input coupled to receive the first feedback signal and an output, and the cycle-skipping circuitry includes:

a comparator having an input coupled to the output of the error amplifier, another input maintained at a threshold potential, and an output at which the comparator asserts a comparator output signal; and logic circuitry, having an input coupled to receive the comparator output signal, and configured to assert the control signal to the switch control signal generation circuitry when the comparator output signal indicates that the output potential is above the predetermined threshold.

37. The controller of claim 36, wherein the logic circuitry is an AND gate having a first input coupled to receive the comparator output signal and a second input coupled to receive a periodic pulse train whose pulses occur with said switching period.

38. The controller of claim 35, wherein the cycle-skipping circuitry is operable in both the discontinuous mode and the continuous mode to assert the control signal to the switch control signal generation circuitry when the output potential is above the predetermined threshold.

39. The controller of claim 30, wherein said controller is configured so that the continuous mode duty cycle is proportional to a ratio of the input potential and the output potential.

40. The controller of claim 30, wherein said controller is a current mode switching controller, the at least one switch control signal includes a second switch control signal, and the power channel circuitry is buck converter circuitry including a second power switch having an input coupled to the first node, an output coupled to a second node, and wherein said additional circuitry includes:

mode control circuitry configured to be coupled to the output node, to trigger entry into the discontinuous pulse skipping mode upon detecting that the inductor current is zero, and to trigger entry into the continuous mode when the inductor current rises from zero to a level above zero.

41. The controller of claim 40, wherein the mode control circuitry includes:

a first comparator having one input configured to be coupled to the first node, another input coupled to the second node, and an output at which the first comparator asserts a comparator output; and a mode signal generation circuit having an input coupled to receive the comparator output, and being configured to produce in response to said comparator output a mode signal indicative of whether or not the inductor current is above zero.

42. A method for generating a power switch control signal for a DC-to-DC converter which generates an output potential $V_{out}$ at an output node in response to an input potential by switching at least a first power switch having an input coupled to receive the input potential and an output coupled to a first node, wherein the converter has an inductor coupled between the first node and the output node so that an inductor current flows through the inductor during operation of the converter, said method including the steps of:

(a) in a continuous mode in which the inductor current remains above zero, generating the power switch control signal in response to a feedback signal indicative of the output potential $V_{out}$, such that said power switch control signal causes the first power switch to operate with a continuous mode duty cycle determined by the feedback signal; and (b) entering a discontinuous pulse skipping mode when the inductor current falls to zero, and in the discontinuous mode, generating the power switch control signal in response to a second feedback signal indicative of $kV_{out}$, where k is a constant, and in response to the feedback signal, such that said power switch control signal causes the first power switch to operate with a duty cycle equal to the longer of a minimum duty cycle and a discontinuous mode duty cycle, wherein the discontinuous mode duty cycle is a duty cycle at which the converter would operate in response to said feedback signal when said converter generates the output potential in response to the input potential during a discontinuous mode without pulse skipping.

43. The method of claim 42, wherein the converter also includes a second power switch having an input coupled to the first node and an output coupled to a second node, and wherein step (b) includes the step of:

determining when the inductor current falls to zero by monitoring voltage across the second power switch.

44. The method of claim 42, wherein step (b) includes the step of:

causing the first power switch to remain off for at least one switching period in response determining that the output potential is above a predetermined threshold.

45. The method of claim 44, wherein step (a) includes the step of:

causing the first power switch to remain off for at least one switching period in response determining that the output potential is above the predetermined threshold.

* * * * *